United States Patent
Liu

(10) Patent No.: US 12,225,590 B2
(45) Date of Patent: Feb. 11, 2025

(54) METHOD, SYSTEM AND DEVICE FOR ACQUIRING RANDOM ACCESS CONFIGURATION INFORMATION

(71) Applicant: BEIJING XIAOMI MOBILE SOFTWARE CO., LTD., Beijing (CN)

(72) Inventor: Yang Liu, Beijing (CN)

(73) Assignee: BEIJING XIAOMI MOBILE SOFTWARE CO., LTD., Beijing (CN)

( * ) Notice: Subject to any disclaimer, the term of this patent is extended or adjusted under 35 U.S.C. 154(b) by 604 days.

(21) Appl. No.: 17/611,876

(22) PCT Filed: May 17, 2019

(86) PCT No.: PCT/CN2019/087432
§ 371 (c)(1),
(2) Date: Nov. 16, 2021

(87) PCT Pub. No.: WO2020/232577
PCT Pub. Date: Nov. 26, 2020

(65) Prior Publication Data
US 2022/0217783 A1    Jul. 7, 2022

(51) Int. Cl.
*H04W 74/0833* (2024.01)
*H04W 74/00* (2009.01)
*H04W 74/0808* (2024.01)

(52) U.S. Cl.
CPC ..... *H04W 74/0833* (2013.01); *H04W 74/002* (2013.01); *H04W 74/0808* (2013.01)

(58) Field of Classification Search
CPC .......... H04W 74/0833; H04W 74/002; H04W 74/0808; H04W 74/085; H04W 16/14
See application file for complete search history.

(56) References Cited

U.S. PATENT DOCUMENTS

| 10,420,135 B2 | 9/2019 | Yang et al. |
| 2017/0303303 A1 | 10/2017 | Yang et al. |
| 2019/0261255 A1 | 8/2019 | You |

(Continued)

FOREIGN PATENT DOCUMENTS

| CN | 106937404 A | 7/2017 |
| CN | 107439045 A | 12/2017 |
| CN | 108024310 A | 5/2018 |

OTHER PUBLICATIONS

International Search Report of PCT Application No. PCT/CN2019/087432 dated Feb. 14, 2020 with English translation, (4p).

(Continued)

*Primary Examiner* — Anez C Ebrahim
(74) *Attorney, Agent, or Firm* — Arch & Lake LLP

(57) ABSTRACT

A random access configuration information obtaining method. The method is executed by a base station, and comprises: configuring a random access index for a terminal, the random access index being configured to instruct the terminal to obtain physical random access channel (PRACH) configuration information of a new radio based unlicensed access (NR-U). wherein the PRACH configuration information indicates rach occasions (ROs) for 2-step random access, and the PRACH configuration information indicates that there is a time interval between the ROs in time domain.

11 Claims, 6 Drawing Sheets

(56) References Cited

U.S. PATENT DOCUMENTS

2021/0289548 A1* 9/2021 Murray ............... H04W 72/23
2022/0225422 A1* 7/2022 Kundu ............. H04W 74/0833

OTHER PUBLICATIONS

Huawei et al., "Random Access in NR Unlicensed", 3GPP TSG RAN WG1 Meeting #92bis R1-1803681, April 6, 2018, (6p).
Sony, "Discussions on 2 Steps RACH Procedure" 3GPP TSG-RANWG2 Meeting AH_NR Meeting, R1-1700471, Spokane, USA, Jan. 17-19, 2017, (5p).

* cited by examiner

| RO | RO | RO | RO |

METHOD, SYSTEM AND DEVICE FOR ACQUIRING RANDOM ACCESS CONFIGURATION INFORMATION

CROSS-REFERENCE TO RELATED APPLICATION

The present application is a U.S. National Phase of International Patent Application Serial No. PCT/CN2019/087432 filed on May 17, 2019. The entire contents of the above-cited application are hereby incorporated by reference in their entirety for all purposes.

BACKGROUND

In order to cope with the increasing communication demand of mobile data, the cellular mobile communication technology has been expanded from licensed frequency bands to unlicensed frequency bands, that is, a New Radio Based Unlicensed Access (NR-U) system.

In the NR-U system, a terminal still needs to establish a wireless communication connection with a base station through random access in order to directly transmit data with the base station.

SUMMARY

The present disclosure relates to the field of wireless communication technology, in particular to a method and apparatus for acquiring random access configuration information, and a readable storage medium.

The disclosure provides a random access configuration information acquiring method and apparatus, and a readable storage medium. The technical solutions are as follows:

According to a first aspect of the present disclosure, a method for acquiring random access configuration information is provided, the method is executed by a base station, and the method includes:

configuring a random access index for a terminal, the random access index being used to instruct the terminal to acquire Physical Random Access Channel (PRACH) configuration information of New Radio Based Unlicensed Access (NR-U);

the PRACH configuration information indicates Rach Occasions (ROs) for 2-step random access, and there are GAPs between the ROs indicated by the PRACH configuration information in time domain.

According to a second aspect of the present disclosure, a method for acquiring random access configuration information is provided, the method is executed by a terminal, and the method includes:

receiving a random access index configured by a base station, the random access index being used to indicate Physical Random Access Channel (PRACH) configuration information of NR-U;

acquiring the PRACH configuration information according to the random access index, the PRACH configuration information indicates ROs for 2-step random access, and there are GAPs between the ROs indicated by the PRACH configuration information in time domain.

According to a third aspect of the present disclosure, an apparatus for acquiring random access configuration information is provided, the apparatus is used in a base station and includes:

a processor;

a memory for storing executable instructions of the processor;

the processor is configured to:

configure a random access index for a terminal, the random access index being used to instruct the terminal to acquire PRACH configuration information of NR-U;

the PRACH configuration information indicates ROs for random access, and there are GAPs between the ROs indicated by the PRACH configuration information in time domain.

According to a fourth aspect of the present disclosure, an apparatus for acquiring random access configuration information is provided, the apparatus is used in a terminal, and the apparatus includes:

a processor;

a memory for storing executable instructions of the processor;

the processor is configured to:

receive a random access index configured by a base station, the random access index being used to indicate PRACH configuration information of NR-U; and acquire the PRACH configuration information according to the random access index, the PRACH configuration information indicates ROs for random access, and there are GAPs between the ROs indicated by the PRACH configuration information in time domain.

According to a fifth aspect of the present disclosure, a non-transitory computer-readable storage medium is provided, the computer-readable storage medium includes executable instructions, and a processor in a base station calls the executable instructions to implement the method for acquiring random access configuration information according to the first aspect or any optional implementation of the first aspect.

According to a sixth aspect of the present disclosure, a non-transitory computer-readable storage medium is provided, the computer-readable storage medium includes executable instructions, and a processor in a terminal calls the executable instructions to implement the method for acquiring random access configuration information according to the second aspect or any optional implementation of the second aspect.

It should be understood that the above general description and the following detailed description are only exemplary and cannot limit the present disclosure.

BRIEF DESCRIPTION OF THE DRAWINGS

To describe the technical solutions of the examples of the present application more clearly, the following briefly introduces the accompanying drawings required for the examples descriptions. Apparently, the accompanying drawings in the following description show only some examples of the present application, and a person of ordinary skill in the art may still derive other drawings from these accompanying drawings without creative efforts.

DETAILED DESCRIPTION

Examples will be described in detail here, and examples thereof are shown in the accompanying drawings. When the following descriptions refer to the drawings, the same numbers in different drawings indicate the same or similar elements, unless otherwise indicated. The implementation manners described in the following examples do not represent all implementation manners consistent with the disclosure. Instead, they are merely examples of apparatuses and methods consistent with some aspects of the disclosure.

It should be understood that the "number of" mentioned herein refers to one or more, and the "plurality of" refers to two or more. "And/or" describes an association relationship of associated objects, indicating three relationships, for example, A and/or B may indicate that A exists alone, A and B exist at the same time, and B exists alone. The character "/" generally indicates that the associated objects before and after are in an "or" relationship.

With the development of wireless communication technology, mobile data is growing rapidly. In order to meet the rapidly growing communication requirements for mobile data, the industry has researched the extension of cellular mobile communication technology to unlicensed frequency bands. For example, in order to extend the fifth-generation (5G) mobile communication technology, also known as new radio (NR) technology to unlicensed frequency bands, the 3rd Generation Partnership Project (3GPP) organization passed the 5G research project "Study on NR-based Access to Unlicensed Spectrum" (NR-U for short), which aims to enable NR to meet the regulatory requirements of unlicensed frequency bands through the research of this project, and can guarantee peaceful coexistence with other access technologies operating on unlicensed frequency bands.

In the NR-U system, a terminal still needs to establish a wireless communication connection with a base station through random access in order to directly transmit data with the base station. In related technologies, the first step in a 2-step random access initiated by the terminal is to send a first random access message (MsgA) to the base station. The terminal can monitor whether a channel is occupied through a Listen Before Talk (LBT) mechanism in a Rach Occasion (RO) configured by the base station. when the channel is occupied, the random access cannot be initiated, that is, the MsgA cannot be sent to the base station. However, there is currently no perfect solution for how to configure the RO for the terminal to send the MsgA in the 2-step random access to the base station.

Figures 1, 2:
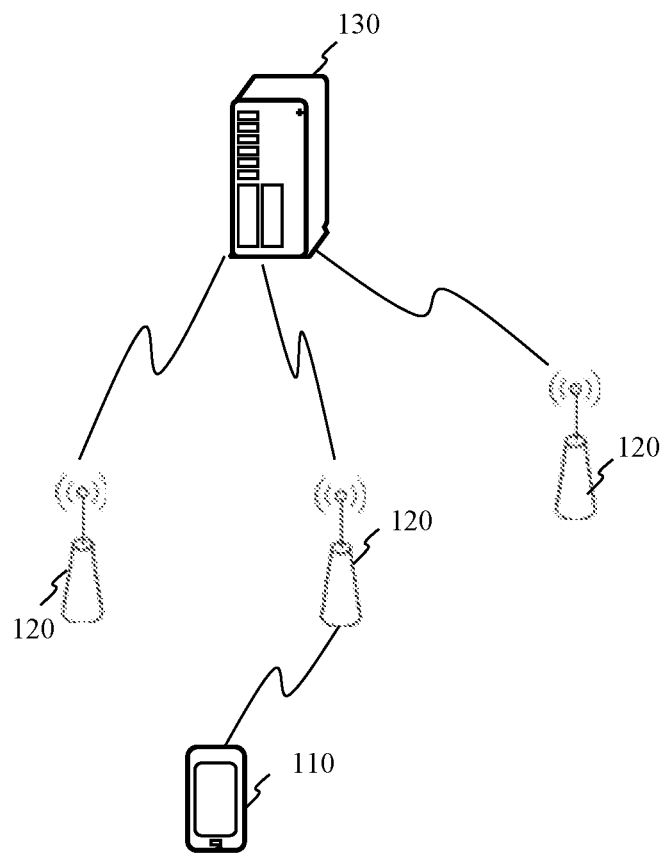
FIG. 1 is a schematic structural diagram of a wireless communication system according to an example of the present disclosure.
FIG. 2 is a schematic structural diagram of an RO configuration according to an example of the present disclosure.

Referring to FIG. 1, a schematic structural diagram of a wireless communication system according to an example of the present disclosure is shown. As shown in FIG. 1, the mobile communication system is a communication system based on cellular mobile communication technology, and the mobile communication system may include a number of terminals 110 and a number of base stations 120.

The terminal 110 may be a device that provides voice and/or data connectivity to a user. The terminal 110 may communicate with one or more core networks via a Radio Access Network (RAN). The terminal 110 may be an Internet of Things terminal, such as a sensor device, a mobile phone (or "cellular" phone), and a computer with an Internet of Things terminal, for example, may be a fixed, portable, pocket-sized, hand-held, computer built-in or vehicle-mounted device. For example, the terminal 110 is a station (STA), a subscriber unit, a subscriber station, a mobile station, a mobile, a remote station, an access point, a remote terminal, an access terminal, a user terminal, a user agent, a user device, or user equipment (UE). Alternatively, the terminal 110 may also be a device of an unmanned aerial vehicle.

The base station 120 may be a network side device in a wireless communication system. The wireless communication system may be the 4th generation mobile communication (4G) system, also known as the Long Term Evolution (LTE) system; or, the wireless communication system may also be the 5G system, also known as the new radio (NR) system. Alternatively, the wireless communication system may also be a next-generation system of the 5G system.

The base station 120 may be an evolved base station (eNB) used in the 4G system. Alternatively, the base station 120 may also be a base station (gNB) adopting a central distributed architecture in the 5G system. When the base station 120 adopts a central distributed architecture, it usually includes a central unit (CU) and at least two distributed units (DUs). The central unit is provided with protocol stacks of a Packet Data Convergence Protocol (PDCP) layer, a Radio Link Control (RLC) layer, and a Media Access Control (MAC) layer; and the distributed unit is provided with a Physical (PHY) layer protocol stack. The example of the disclosure does not limit the specific implementation of the base station 120.

A wireless connection can be established between the base station 120 and the terminal 110 through a wireless air interface. In different examples, the wireless air interface is a wireless air interface based on the fourth-generation mobile communication network technology (4G) standards; or, the wireless air interface is a wireless air interface based on the fifth-generation mobile communication network technology (5G) standards, for example, the wireless air interface is new radio; or, the wireless air interface may also be a wireless air interface based on 5G-based next-generation mobile communication network technology standards.

Optionally, the foregoing wireless communication system may further include a network management device 130.

The number of base stations 120 is connected to the network management device 130 respectively. The network management device 130 may be a core network device in a wireless communication system. For example, the network management device 130 may be a Mobility Management Entity (MME) in an Evolved Packet Core (EPC). Alternatively, the network management device may also be other core network devices, such as a Serving GateWay (SGW), a Public Data Network GateWay (PGW), a Policy and Charging Rules Function (PCRF) unit, or a Home Subscriber Server (HSS). The implementation form of the network management device 130 is not limited in the example of the disclosure.

In a possible implementation manner, the terminal and the base station in the above-mentioned wireless communication system may have the ability to use unlicensed frequency bands based on cellular mobile communication technology (such as NR-U ability). Correspondingly, the terminal having the ability to use unlicensed frequency bands based on cellular mobile communication technology can initiate a random access request to the base station having the same ability on unlicensed frequency bands. Optionally, the terminal and the base station in the wireless communication system can work in licensed frequency bands, that is, have NR ability. No matter in the NR system or the NR-U system, the terminal needs to initiate random access to the base station to establish a cellular mobile communication connection, and transmits data through the cellular mobile communication technology.

In the NR-U system, the terminal needs to perform LBT at an RO location configured by the base station before initiating random access (i.e. before sending MsgA to the base station). If the channel is busy (i.e. being occupied), the terminal will not send MsgA at the corresponding RO location to the base station, that is, cannot initiate random access. Optionally, the time when the terminal performs LBT may also be pre-configured by the base station for the terminal. For example, the base station may pre-inform the terminal to perform LBT within a fixed time before sending MsgA. Referring to FIG. 2, a schematic structural diagram of an RO configuration in a related technology according to an example of the present disclosure is shown. FIG. 2 shows a plurality of ROs configured by the base station for the terminal. After receiving RO resources configured by the base station, the terminal can initiate random access at each RO location, and performs LBT in the corresponding RO location before initiating random access. When the LBT corresponding to one of the ROs succeeds, the terminal initiates random access at the RO location.

For the NR-U system, in a 2-step random access process, the MsgA sent by the terminal to the base station is composed of content sent in a Physical Random Access Channel (PRACH) and content sent in a Physical uplink shared channel (PUSCH), and the both are transmitted by Time Division Multiplexing (TDM) technology. If the RO configuration shown in FIG. 2 is followed, when the MsgA sent by the terminal includes the content in the PRACH and the content in the PUSCH, LBT needs to be performed on the PRACH and the PUSCH respectively. If the terminal succeeds in performing LBT on the PRACH, the content corresponding to the PRACH in the MsgA can be sent, but when the subsequent LBT performed on the PUSCH fails, the current sending of the MsgA fails. If the above RO configuration scheme is directly applied to the 2-step random access in the NR-U system, the current random access of the terminal may fail to affect the random access efficiency of the terminal.

Figure 3:
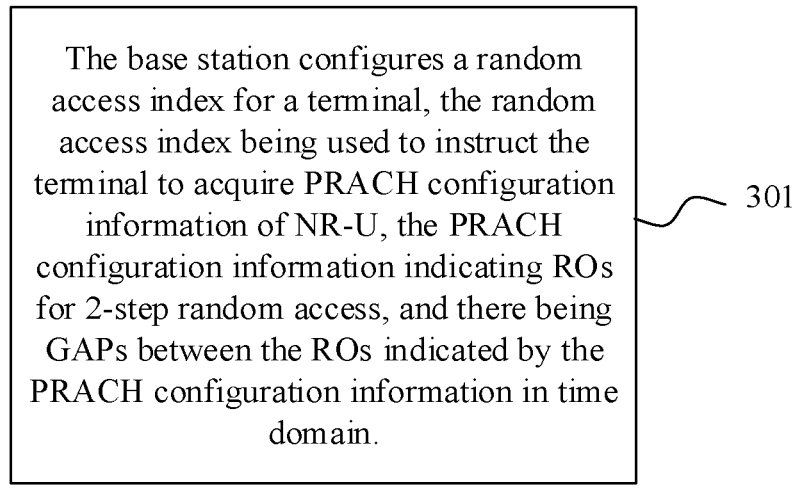
FIG. 3 is a flowchart of a method for acquiring random access configuration information according to an example of the present disclosure.

In order to avoid the above problems, an example of the present disclosure provides a method for acquiring random access configuration information. Referring to FIG. 3, a flowchart of a method for acquiring random access configuration information according to an example of the present disclosure is shown. The method for acquiring random access configuration information can be applied to the wireless communication system shown in FIG. 1 and executed by the base station in FIG. 1. The method may include the following steps.

In step 301, the base station configures a random access index for a terminal, the random access index being used to instruct the terminal to acquire Physical Random Access Channel (PRACH) configuration information of New Radio Based Unlicensed Access (NR-U), the PRACH configuration information indicating Rach Occasions (ROs) for 2-step random access, and there being GAPs between the ROs indicated by the PRACH configuration information in time domain.

Optionally, the PRACH configuration information is information configured according to any one of PRACH configuration format 1, PRACH configuration format 2, PRACH configuration format 3, or PRACH configuration format C;

Or,

The PRACH configuration information is information configured according to PRACH configuration format A or PRACH configuration format B.

Optionally, the method further includes:

A first random access message sent by the terminal according to the PRACH configuration information is received, the first random access message being MsgA in a 2-step random access message of NR-U.

Optionally, the receiving a first random access message sent by the terminal according to the PRACH configuration information includes:

The first random access message sent by the terminal in a Listen Before Talk (LBT) manner in the RO indicated by the PRACH configuration information is received.

Optionally, the receiving a first random access message sent by the terminal according to the PRACH configuration information includes:

The first random access message sent by the terminal in an LBT manner within a single Channel Occupy Time (COT) in the RO indicated by the PRACH configuration information is received.

In summary, the base station configures a random access index for the terminal, the random access index being used to instruct the terminal to acquire PRACH configuration information of NR-U, the PRACH configuration information indicating ROs for 2-step random access, and there being GAPs between the ROs indicated by the PRACH configuration information in time domain. In the disclosure, the base station sends a random access index to the terminal to instruct the terminal, to acquire PRACH configuration information, and to initiate 2-step random access to the base station by using each RO for the 2-step random access indicated in the PRACH configuration information and the GAPs between the ROs in time domain, which can send the first random access message MsgA in the same channel occupy time, reduce the collision of sending MsgA between different terminals, and improve the efficiency of random access of the terminal.

Figure 4:
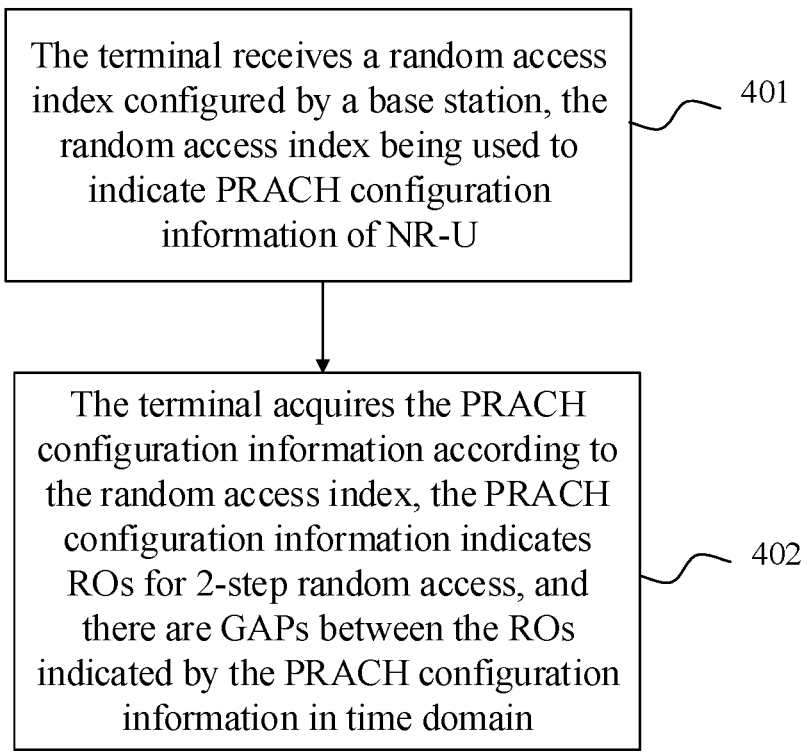
FIG. 4 is a flowchart of a method for acquiring random access configuration information according to an example of the present disclosure.

Referring to FIG. 4, a flowchart of a method for acquiring random access configuration information according to an example of the present disclosure is shown. The method for acquiring random access configuration information can be applied to the wireless communication system shown in FIG. 1 and executed by the terminal in FIG. 1. The method may include the following steps.

In step 401, the terminal receives a random access index configured by a base station, the random access index being used to indicate PRACH configuration information of NR-U.

In step 402, the terminal acquires the PRACH configuration information according to the random access index, the PRACH configuration information indicating ROs for 2-step random access, and there being GAPs between the ROs indicated by the PRACH configuration information in time domain.

Optionally, the PRACH configuration information is information configured according to any one of PRACH configuration format 1, PRACH configuration format 2, PRACH configuration format 4, or PRACH configuration format C;

Or,

The PRACH configuration information is information configured according to PRACH configuration format A or PRACH configuration format B.

Optionally, the acquiring the PRACH configuration information according to the random access index includes:

The PRACH configuration information is queried from a PRACH configuration table according to the random access index.

Optionally, the method further includes:

A first random access message is sent to the base station according to the PRACH configuration information, the first random access message being MsgA in a 2-step random access message of NR-U.

Optionally, the sending a first random access message to the base station according to the PRACH configuration information includes:

A time-frequency offset of a Synchronization Signal Block (SSB) of the base station is detected;

Synchronization time-frequency offset is performed on the RO indicated by the PRACH configuration information according to the time-frequency offset of the SSB;

The first random access message is sent to the base station according to the RO after the synchronization offset.

Optionally, the sending a first random access message to the base station according to the PRACH configuration information includes:

The first random access message is sent in an LBT manner in the RO indicated by the PRACH configuration information.

Optionally, the sending a first random access message to the base station according to the PRACH configuration information includes:

The first random access message is sent in an LBT manner within a single COT in the RO indicated by the PRACH configuration information.

In summary, the base station configures a random access index for the terminal, the random access index being used to instruct the terminal to acquire PRACH configuration information of NR-U, the PRACH configuration information indicating ROs for 2-step random access, and there being GAPs between the ROs indicated by the PRACH configuration information in time domain. In the disclosure, the base station sends a random access index to the terminal to instruct the terminal, to acquire PRACH configuration information, and to initiate 2-step random access to the base station by using each RO for the 2-step random access indicated in the PRACH configuration information and the GAPs between the ROs in time domain, which can send the first random access message MsgA in the same channel occupy time, reduce the collision of sending MsgA between different terminals, and improve the efficiency of random access of the terminal.

In a possible implementation manner, each RO for the 2-step random access indicated in the PRACH configuration information also has a fixed relative time-frequency location with the SSB sent by the base station, for example, the RO closest to the time-frequency location of the SSB among the ROs indicated in the PRACH configuration information is spaced apart from the time-frequency location of the SSB by 3 time slots. Then, the terminal also needs to receive the SSB sent by the base station.

Figure 5:
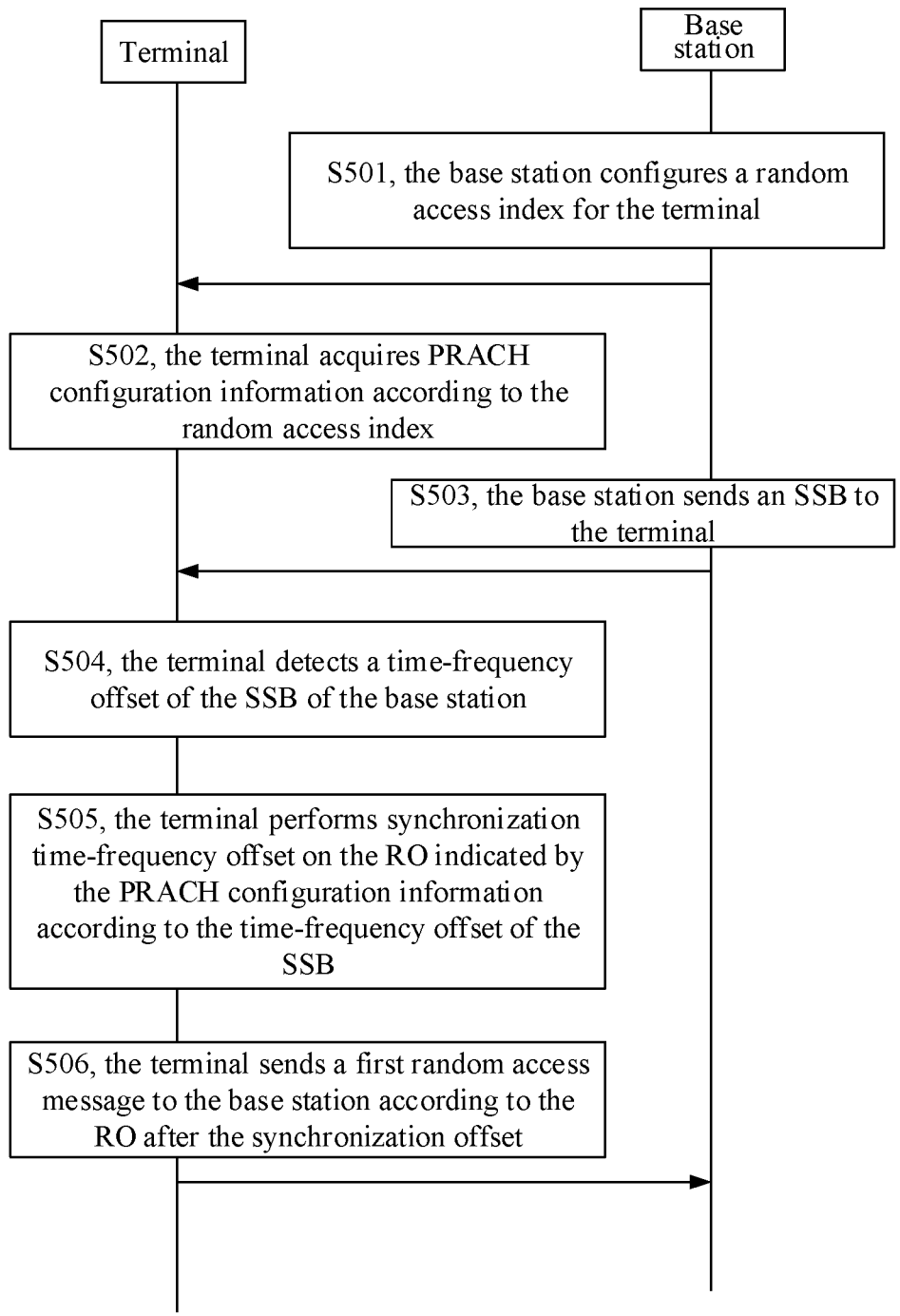
FIG. 5 is a flowchart of a method for acquiring random access configuration information according to an example of the present disclosure.

In a possible implementation manner, the terminal needs to synchronize with the base station in advance before initiating random access to the base station, that is, the terminal needs to receive the SSB sent by the base station, and initiates random access on the corresponding random access resource after completing synchronization with the base station Referring to FIG. 5, a method for acquiring random access configuration information according to an example of the present disclosure is shown. The method can be applied to the wireless communication system shown in FIG. 1 and executed by the terminal and the base station in FIG. 1. The method may include the following steps.

In step 501, the base station configures a random access index for the terminal.

Correspondingly, the terminal receives the random access index configured by the base station.

The random access index is used to instruct the terminal to acquire PRACH configuration information of NR-U. That is, after receiving the random access index sent by the base station, the terminal can acquire PRACH configuration information of NR-U through the random access index. Optionally, when the base station sends the configured random access index, the random access index can be sent out in the form of system broadcast, or a plurality of terminals can obtain the same random access index.

Figure 6:
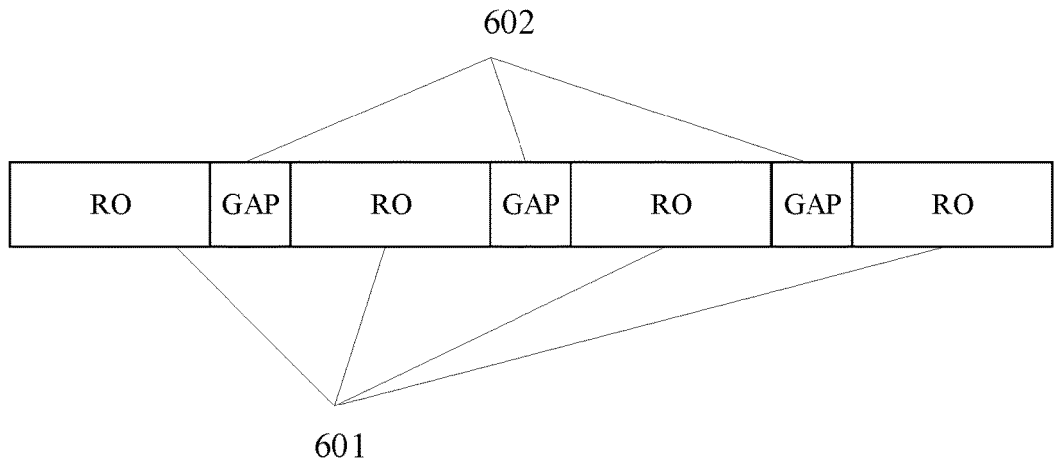
FIG. 6 is a schematic structural diagram of RO resources included in PRACH configuration information according to an example of the present disclosure.

Optionally, the PRACH configuration information may indicate ROs for 2-step random access, and there are GAPs between the ROs indicated by the PRACH configuration information in time domain. That is, the PRACH configuration information may include RO resources for 2-step random access and GAPs between the ROs in time domain. Referring to FIG. 6, a schematic structural diagram of RO resources included in PRACH configuration information according to an example of the present disclosure is shown. FIG. 6 shows RO resources 601 and GAPs 602 between the ROs in use. The terminal can initiate 2-step random access to the base station on each RO resource 601 shown in FIG. 6.

In step 502, the terminal acquires PRACH configuration information according to the random access index.

In a possible implementation manner, the terminal may query, according to the random access index, the corresponding PRACH configuration information from a PRACH configuration table. Optionally, the PRACH configuration table may also be broadcast by the base station through a system, received by the terminal in advance, and stored locally in the terminal. Optionally, the base station may send the PRACH configuration table to the terminal through another system message before sending the random access index. Alternatively, the system message carrying the PRACH configuration table that is broadcast by the base station may also carry the random access index, that is, the base station can simultaneously send the PRACH configuration table and the random access index through system broadcast, and when the terminal receives the system message broadcast by the base station, the PRACH configuration table can be acquired, and the corresponding PRACH configuration information in the PRACH configuration table can be queried according to the random access index. Alternatively, the PRACH configuration table may be preset in the terminal, and when the terminal needs to query the PRACH configuration table, it can directly query the PRACH configuration table stored in the terminal itself. The example of the disclosure does not limit how the PRACH configuration table of the terminal is acquired.

Referring to Table 1, a PRACH configuration table involved in the example of the disclosure is shown, including a corresponding relationship between a random access index and PRACH configuration information.

TABLE 1

| Random access index | PRACH configuration information |
| --- | --- |
| Random access index 1 | PRACH configuration information 1 |
| Random access index 2 | PRACH configuration information 2 |
| Random access index 3 | PRACH configuration information 3 |

Optionally, when the terminal receives the random access index configured by the base station, it can obtain the PRACH configuration information corresponding to the random access index by querying Table 1 above. For example, when the random access index sent by the base station that is received by the terminal is random access index 1 in the table, the terminal can obtain PRACH configuration information 1 corresponding to the random access index 1 by querying Table 1 above, and acquire the PRACH configuration information.

Optionally, the PRACH configuration information included in Table 1 above may be information configured according to any one of PRACH configuration format 1, PRACH configuration format 2, PRACH configuration format 3, or PRACH configuration format C. For example, the base station may use any one of PRACH format 1, PRACH format 2, PRACH format 3, or PRACH format C, which are not used in the NR-U system, to provide RO configuration and GAP configuration for 2-step random access in the NR-U system according to the schematic structural diagram of configuration shown in FIG. 6.

Optionally, the PRACH configuration information included in Table 1 above may also be information configured according to PRACH configuration format A or PRACH configuration format B. That is, the base station may use PRACH format A format or PRACH format B format that has been used in the NR-U system, to provide RO configuration and GAP configuration for 2-step random access in the NR-U system according to the schematic structural diagram of configuration shown in FIG. 6. Optionally, when the terminal needs to initiate random access to the base station, the terminal may initiate random access to the base station according to the acquired PRACH configuration information.

In step 503, the base station sends an SSB to the terminal.

Correspondingly, the terminal receives the SSB sent by the base station.

Optionally, the terminal may acquire the PRACH configuration information according to steps 501 and 502 above, and initiate 2-step random access to the base station by using the acquired PRACH configuration information. The terminal needs to synchronize with the base station before initiating the 2-step random access to the base station.

Optionally, the base station may send the SSB in an LBT manner. In a possible implementation manner, when the LBT fails during the sending of the SSB by the base station, the base station can delay the sending time of the SSB, that is, send the SSB to the terminal again when the LBT on the subsequent time-frequency resource succeeds.

Figure 7:
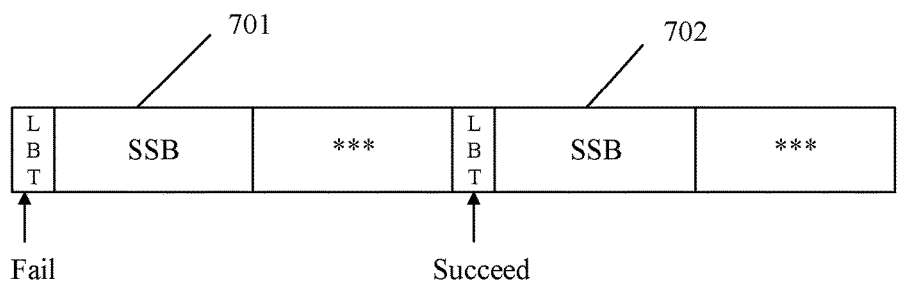
FIG. 7 is a schematic diagram of actual time-frequency resource distribution of SSB sent by a base station according to an example of the present disclosure.

Referring to FIG. 7, a schematic diagram of actual time-frequency resource distribution of SSB sent by a base station according to an example of the present disclosure is shown. As shown in FIG. 7, a first time-frequency resource location 701 and a second time-frequency resource location 702 are included. The base station fails to perform LBT on the first time-frequency resource location 701, so as not to send SSB in the first time-frequency resource location 701. When the base station succeeds in performing LBT on the second time-frequency resource location 702, the base station may send SSB in the second time-frequency resource location 702.

In step 504, the terminal detects a time-frequency offset of the SSB of the base station.

In a possible implementation manner, the terminal may calculate the time-frequency offset of the SSB sent by the base station according to the time-frequency resource location of the SSB sent by the base station that is actually obtained by the terminal itself.

Referring to FIG. 7 above, when the base station sends the SSB, the LBT can be performed on the first time-frequency resource location 701. If the LBT fails, the SSB will not be sent in the first time-frequency resource location 701. When the subsequent LBT performed by the base station on the second time-frequency resource location 702 succeeds, the base station can send the SSB in the second time-frequency resource location 702. Correspondingly, when the terminal detects the SSB sent by the base station, it receives the SSB sent by the base station in the second time-frequency resource location 702, that is, detects the SSB sent by the base station in the second time-frequency resource location 702. Then the terminal can obtain the time-frequency offset of the SSB of the base station according to the second time-frequency resource location 702.

In step 505, the terminal performs synchronization time-frequency offset on the RO indicated by the PRACH configuration information according to the time-frequency offset of the SSB.

Optionally, in the NR-U system, there is a fixed relative time-frequency location between the first RO among the ROs indicated by the PRACH configuration information for the 2-step random access initiated by the terminal and the SSB sent by the base station. When detecting that the SSB sent by the base station is offset in time frequency, the terminal may also offset each RO indicated by the PRACH configuration information by the same time-frequency distance. Optionally, the relative time-frequency location may be carried in the system message broadcast by the base station and sent by the base station to the terminal.

Figure 8:
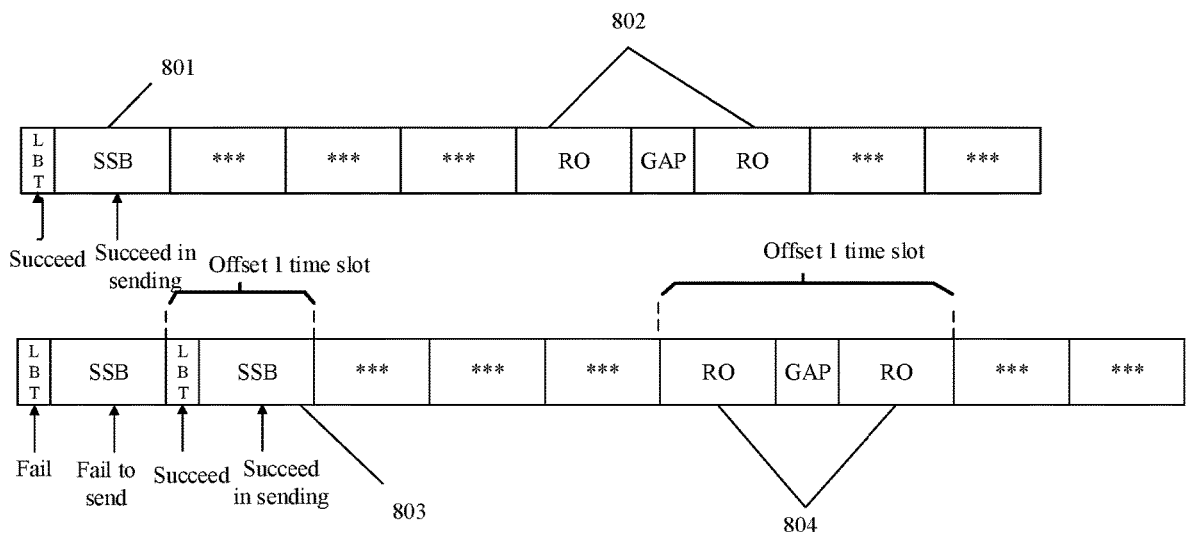
FIG. 8 is a schematic diagram of relative time-frequency locations between RO and SSB according to an example of the present disclosure.

The relative time-frequency location of 3 time slots is taken as an example, referring to FIG. 8, which shows a schematic diagram of relative time-frequency locations between RO and SSB according to an example of the present disclosure. FIG. 8 shows a first time-frequency resource location 801, a second time-frequency resource location 802, a third time-frequency resource location 803, and a fourth time-frequency resource location 804. The first time-frequency resource location 801 is a time-frequency resource location of SSB sent fail by the corresponding base station, and the second time-frequency resource location 802 is an RO resource location included in the PRACH configuration information acquired by the corresponding terminal. The third time-frequency resource location 803 is a time-frequency resource location of SSB actually sent successfully by the corresponding base station, and the fourth time-frequency resource location 804 is a resource location after the corresponding terminal offsets the RO resource location included in the PRACH configuration information according to the time-frequency offset of the SSB.

When the base station fails to perform LBT on the first time-frequency resource location 801, the SSB is not sent in the first time-frequency resource location 801. However, when the base station succeeds in performing LBT on the third time-frequency resource location 803, the base station can send the SSB in the third time-frequency resource location 803. When detecting the SSB sent by the base station, the terminal receives the SSB sent by the base station in the third time-frequency resource location 803, that is, detects the SSB sent by the base station in the third time-frequency resource location 803, the terminal can obtain a time-frequency offset (i.e. 1 time slot) of the SSB, and the terminal can also offset the corresponding RO by 1 time slot, that is, offset from the second time-frequency resource location 802 to the fourth time-frequency resource location 804. It should be noted that the PRACH configuration information indicates 2 ROs as an example in FIG. 8, and when the PRACH configuration information indicates more ROs, the offset can also be performed with reference to FIG. 8, and details are not described herein again.

In a possible implementation manner, the terminal can also directly offset each RO indicated by the PRACH configuration information by a unified time-frequency resource location through the time-frequency resource location of the actually received SSB sent by the base station and the fixed relative time-frequency location between the first RO among the ROs indicated by the PRACH configuration information and the SSB sent by the base station. For example, in FIG. 8 above, the terminal obtains the third time-frequency resource location 803 that is the actual time-frequency resource location of the SSB sent by the base station, and the terminal learns, through the system message broadcast by the base station, the fixed relative time-frequency location of 3 time slots between the first RO among the ROs indicated by the PRACH configuration information and the SSB sent by the base station, then the terminal can offset the first RO in the second time-frequency resource location 802 relative to the third time-frequency resource location 803 by 3 time slots, and keep other RO resource locations and the first RO resource location unchanged.

In step 506, the terminal sends a first random access message to the base station according to the RO after the synchronization offset.

Correspondingly, the base station receives the first random access message sent by the terminal to the base station according to the RO after the synchronization offset. The first random access message may be MsgA in the 2-step random access message of NR-U.

When the terminal needs to initiate 2-step random access with the base station at this time, the terminal can send the MsgA to the base station according to the RO after the synchronization offset. In a possible implementation manner, when the terminal acquires certain PRACH configuration information in Table 1 above, it can obtain each RO for 2-step random access included in the PRACH configuration information, and GAPs between the ROs in the PRACH configuration information in time domain. After the terminal offsets each RO in the PRACH configuration information, the terminal may send the MsgA on the RO after the synchronization offset.

Optionally, the terminal may send the MsgA in an LBT manner in the RO indicated by the PRACH configuration information. That is, when the terminal sends the MsgA, it can also detect the corresponding RO resource, and sends the MsgA to the base station on the corresponding RO resource when monitoring that the RO resource is idle.

Optionally, in the NR-U system, the MsgA is composed of first content and second content. The first content may be content that needs to be sent by the terminal in the Physical Random Access Channel (PRACH), and the second content may be content that needs to be sent by the terminal in the Physical Uplink Shared Channel (PUSCH). The terminal can send the MsgA within the single COT in the RO indicated by the PRACH configuration information.

Figure 9:
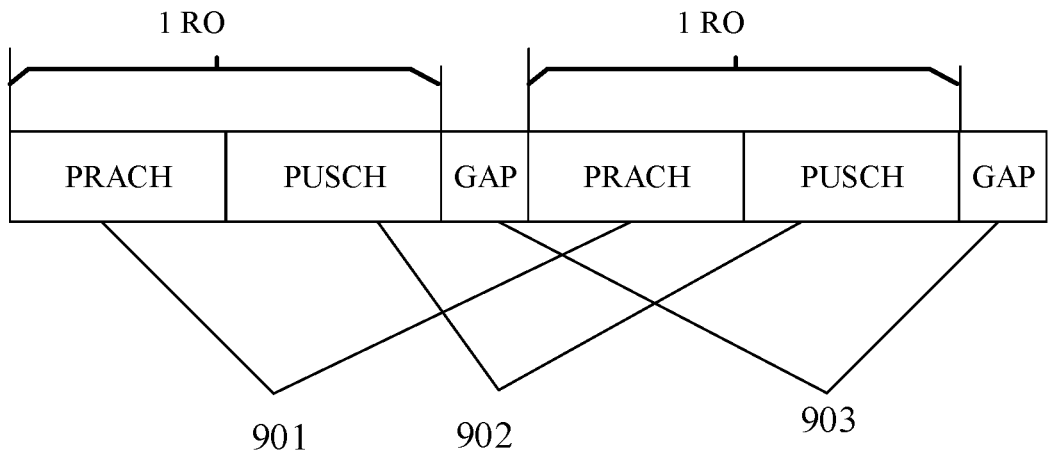
FIG. 9 is a schematic structural diagram of RO resources included in PRACH configuration information according to an example of the present disclosure.

Referring to FIG. 9, a schematic structural diagram of RO resources included in the PRACH configuration information according to an example of the present disclosure is shown. FIG. 9 shows resource locations 901 corresponding to the first content, resource locations 902 corresponding to the second content, and GAPs 903. The terminal can directly send the first content and the second content within the single COT in the RO. Correspondingly, the base station can also receive the first content and the second content sent by the terminal within the single COT in the corresponding RO.

In summary, the base station configures a random access index for the terminal, the random access index being used to instruct the terminal to acquire PRACH configuration information of NR-U, the PRACH configuration information indicating ROs for 2-step random access, and there being GAPs between the ROs indicated by the PRACH configuration information in time domain. In the disclosure, the base station sends a random access index to the terminal to instruct the terminal, to acquire PRACH configuration information, and to initiate 2-step random access to the base station by using each RO for the 2-step random access indicated in the PRACH configuration information and the GAPs between the ROs in time domain, which can send the first random access message MsgA in the same channel occupy time, reduce the collision of sending MsgA between different terminals, and improve the efficiency of random access of the terminal.

The following are apparatus examples of the disclosure, which can be used to implement the method examples of the disclosure. Details that are not disclosed in the apparatus examples of the disclosure may refer to the method examples of the disclosure.

Figure 10:
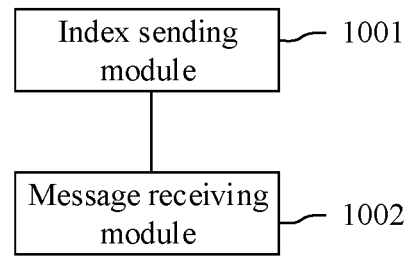
FIG. 10 is a block diagram of an apparatus for acquiring random access configuration information according to an example.

FIG. 10 is a block diagram of an apparatus for acquiring random access configuration information according to an example. As shown in FIG. 10, the apparatus for acquiring random access configuration information may be implemented by hardware or a combination of hardware and software as all or part of the base station in the wireless communication system shown in FIG. 1, to execute the steps performed by the base station in any one of the examples shown in FIG. 3 or FIG. 5. The apparatus for acquiring random access configuration information may include:

an index sending module 1001, configured to configure a random access index for a terminal, the random access index being used to instruct the terminal to acquire PRACH configuration information of NR-U;

The PRACH configuration information indicates ROs for 2-step random access, and there are GAPs between the ROs indicated by the PRACH configuration information in time domain.

Optionally, the PRACH configuration information is information configured according to any one of PRACH configuration format 1, PRACH configuration format 2, PRACH configuration format 3, or PRACH configuration format C;

Or,

The PRACH configuration information is information configured according to PRACH configuration format A or PRACH configuration format B.

Optionally, the apparatus further includes:

a message receiving module 1002, configured to receive a first random access message sent by the terminal according to the PRACH configuration information, the first random access message being MsgA in a 2-step random access message of NR-U.

Optionally, the message receiving module 1002 is configured to:

receive the first random access message sent by the terminal in an LBT manner in the RO indicated by the PRACH configuration information.

Optionally, the message receiving module 1002 is configured to:

receive the first random access message sent by the terminal in an LBT manner within a single COT in the RO indicated by the PRACH configuration information.

Figure 11:
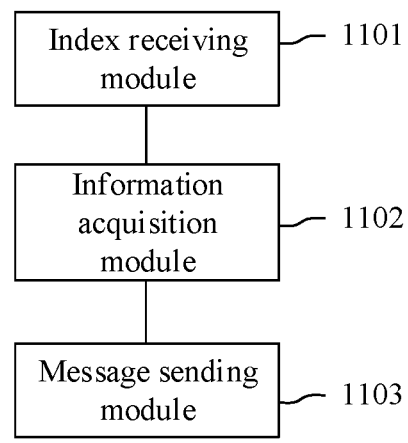
FIG. 11 is a block diagram of an apparatus for acquiring random access configuration information according to an example.

FIG. 11 is a block diagram of an apparatus for acquiring random access configuration information according to an example. As shown in FIG. 11, the apparatus for acquiring random access configuration information may be implemented by hardware or a combination of hardware and software as all or part of the terminal in the wireless communication system shown in FIG. 1, to execute the steps performed by the terminal in any one of the examples shown in FIG. 4 or FIG. 5. The apparatus for acquiring random access configuration information may include:

an index receiving module 1101, configured to receive a random access index configured by a base station, the random access index being used to indicate PRACH configuration information of NR-U;

an information acquisition module 1102, configured to acquire the PRACH configuration information according to the random access index, the PRACH configuration information indicating ROs for 2-step random access, and there being GAPs between the ROs indicated by the PRACH configuration information in time domain.

Optionally, the PRACH configuration information is information configured according to any one of PRACH configuration format 1, PRACH configuration format 2, PRACH configuration format 3, or PRACH configuration format C;

Or,

The PRACH configuration information is information configured according to PRACH configuration format A or PRACH configuration format B.

Optionally, the information acquisition module 1102 is configured to:

query, according to the random access index, the PRACH configuration information from a PRACH configuration table.

Optionally, the apparatus further includes: a message sending module 1103;

The message sending module is configured to send a first random access message to the base station according to the PRACH configuration information, the first random access message being MsgA in a 2-step random access message of NR-U.

Optionally, the message sending module 1103 includes: an offset detection submodule, a time-frequency offset submodule, and a message sending submodule;

The offset detection submodule is configured to detect a time-frequency offset of an SSB of the base station;

The time-frequency offset submodule is configured to perform synchronization time-frequency offset on the RO indicated by the PRACH configuration information according to the time-frequency offset of the SSB;

The message sending submodule is configured to send the first random access message to the base station according to the RO after the synchronization offset.

Optionally, the message sending module 1103 is configured to:

send the first random access message in an LBT manner in the RO indicated by the PRACH configuration information.

Optionally, the message sending module 1103 is configured to:

send the first random access message in an LBT manner within a single COT in the RO indicated by the PRACH configuration information.

It should be noted that, when the apparatus provided in the above example realizes its functions, only the division of the above-mentioned functional modules is used as an example for illustration. In actual applications, the functions can be completed by different functional modules according to actual requirements. That is, the content structure of the apparatus is divided into different functional modules to complete all or part of the functions described above.

With regard to the apparatus in the above example, the specific manners that the respective modules perform the operations have been described in detail in the example relating to the method, and will not be explained in detail herein.

An example of the disclosure provides an apparatus for acquiring random access configuration information, which can implement all or part of the steps performed by the base station in the example shown in FIG. 3 or FIG. 5. The apparatus for acquiring random access configuration information includes: a processor and a memory for storing executable instructions of the processor;

The processor is configured to:

configure a random access index for a terminal, the random access index being used to instruct the terminal to acquire PRACH configuration information of NR-U;

The PRACH configuration information indicates ROs for 2-step random access, and there are GAPs between the ROs indicated by the PRACH configuration information in time domain.

Optionally, the PRACH configuration information is information configured according to any one of PRACH configuration format 1, PRACH configuration format 2, PRACH configuration format 3, or PRACH configuration format C;

Or,

The PRACH configuration information is information configured according to PRACH configuration format A or PRACH configuration format B.

Optionally, the processor is further configured to:

receive a first random access message sent by the terminal according to the PRACH configuration information, the first random access message being MsgA in a 2-step random access message of NR-U.

Optionally, for receiving a first random access message sent by the terminal according to the PRACH configuration information, the processor is configured to:

receive the first random access message sent by the terminal in an LBT manner in the RO indicated by the PRACH configuration information.

Optionally, for receiving a first random access message sent by the terminal according to the PRACH configuration information, the processor is configured to:

receive the first random access message sent by the terminal in an LBT manner within a single COT in the RO indicated by the PRACH configuration information.

An example of the disclosure provides an apparatus for acquiring random access configuration information, which can implement all or part of the steps performed by the terminal in the example shown in FIG. 4 or FIG. 5. The apparatus for acquiring random access configuration information includes: a processor and a memory for storing executable instructions of the processor;

The processor is configured to:

receive a random access index configured by a base station, the random access index being used to indicate PRACH configuration information of NR-U;

acquire the PRACH configuration information according to the random access index, the PRACH configuration information indicating ROs for 2-step random access, and there being GAPs between the ROs indicated by the PRACH configuration information in time domain.

Optionally, the PRACH configuration information is information configured according to any one of PRACH configuration format 1, PRACH configuration format 2, PRACH configuration format 3, or PRACH configuration format C;

Or,

The PRACH configuration information is information configured according to PRACH configuration format A or PRACH configuration format B.

Optionally, for acquiring the PRACH configuration information according to the random access index, the processor is configured to:

query, according to the random access index, the PRACH configuration information from a PRACH configuration table.

Optionally, the processor is further configured to:

send a first random access message to the base station according to the PRACH configuration information, the first random access message being MsgA in a 2-step random access message of NR-U.

Optionally, for sending a first random access message to the base station according to the PRACH configuration information, the processor is configured to:

detect a time-frequency offset of an SSB of the base station;

perform synchronization time-frequency offset on the RO indicated by the PRACH configuration information according to the time-frequency offset of the SSB; and send the first random access message to the base station according to the RO after the synchronization offset.

Optionally, for sending a first random access message to the base station according to the PRACH configuration information, the processor is configured to:

send the first random access message in an LBT manner in the RO indicated by the PRACH configuration information.

Optionally, for sending a first random access message to the base station according to the PRACH configuration information, the processor is configured to:

send the first random access message in an LBT manner within a single COT in the RO indicated by the PRACH configuration information.

The solutions provided by the examples of the disclosure are described above, mainly taking the terminal and the base station as an example. It can be understood that, in order to realize the above functions, the terminal and the base station include corresponding hardware structures and/or software modules for executing the functions. In combination with the modules and algorithm steps of the examples described in the examples of the disclosure, the examples of the disclosure can be implemented in the form of hardware or a combination of hardware and computer software. Whether a certain function is executed by hardware or computer software-driven hardware depends on the specific application and design constraint conditions of the technical solution. Those skilled in the art can use different methods for each specific application to implement the described functions, but such implementation should not be considered as going beyond the scope of the technical solutions of the examples of the disclosure.

Figure 12:
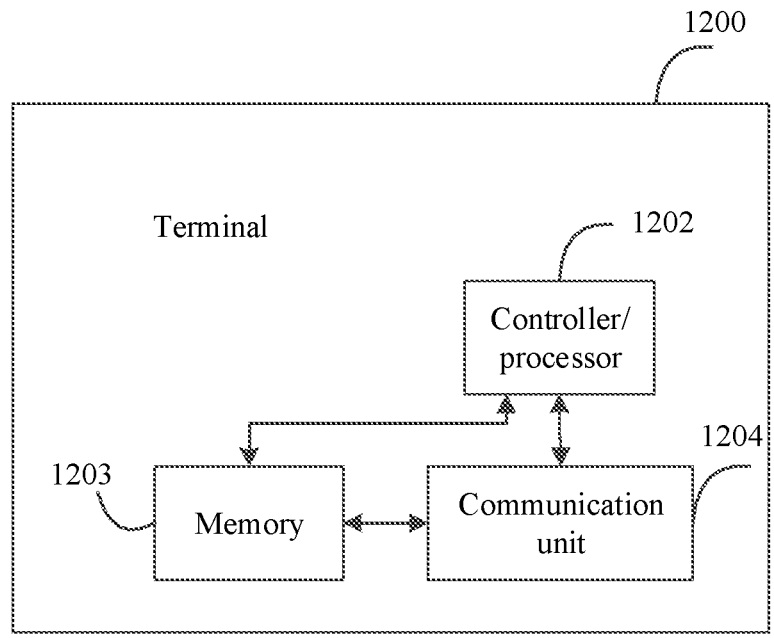
FIG. 12 is a schematic structural diagram of a terminal according to an example.

FIG. 12 is a schematic structural diagram of a terminal according to an example.

The terminal 1200 includes a communication unit 1204 and a processor 1202. The processor 1202 may also be a controller, which is represented as "controller/processor 1202" in FIG. 12. The communication unit 1204 is configured to support the terminal to communicate with other network devices (such as a base station).

Further, the terminal 1200 may include a memory 1203, and the memory 1203 is configured to store program codes and data of the terminal 1200.

It is understandable that FIG. 12 only shows a simplified design of the terminal 1200. In practical applications, the terminal 1200 may include any number of processors, controllers, memories, communication units, etc., and all terminals that can implement the examples of the disclosure fall within the protection scope of the examples of the disclosure.

Figure 13:
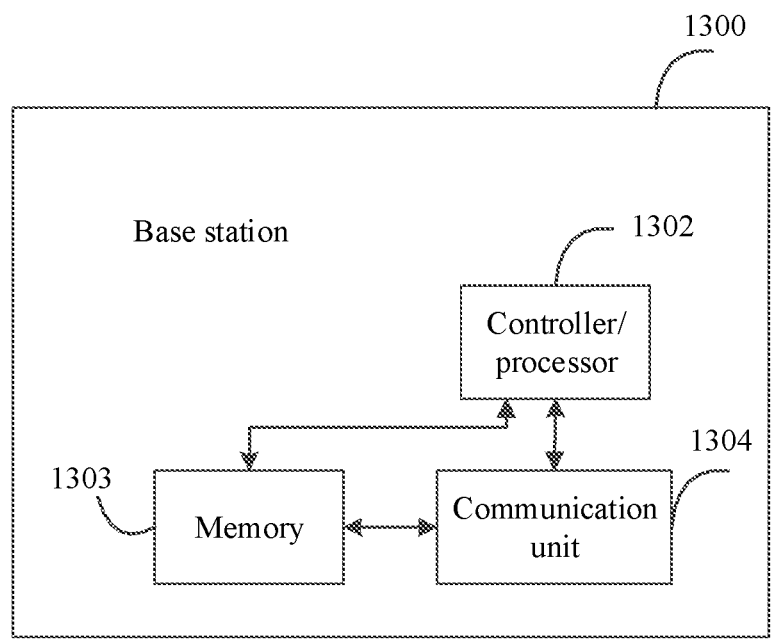
FIG. 13 is a schematic structural diagram of a base station according to an example.

FIG. 13 is a schematic structural diagram of a base station according to an example.

The base station 1300 includes a communication unit 1304 and a processor 1302. The processor 1302 may also be a controller, which is represented as "controller/processor 1302" in FIG. 13. The communication unit 1304 is configured to support the base station to communicate with other network devices (such as a terminal, other base station, and a gateway).

Further, the base station 1300 may include a memory 1303, and the memory 1303 is configured to store program codes and data of the base station 1300.

It is understandable that FIG. 13 only shows a simplified design of the base station 1300. In practical applications, the base station 1300 may include any number of processors, controllers, memories, communication units, etc., and all base stations that can implement the examples of the disclosure fall within the protection scope of the examples of the disclosure.

Those skilled in the art should be aware that, in one or more of the above examples, the functions described in the examples of the disclosure may be implemented by hardware, software, firmware, or any combination of them. When implemented by software, these functions can be stored in a computer-readable medium or transmitted as one or more instructions or codes on the computer-readable medium. The computer-readable medium includes a computer storage medium and a communication medium, the communication medium including any medium that facilitates the transfer of a computer program from one place to another. The storage medium may be any available medium that can be accessed by a general-purpose or special-purpose computer.

The present disclosure may include dedicated hardware implementations such as application specific integrated circuits, programmable logic arrays and other hardware devices. The hardware implementations can be constructed to implement one or more of the methods described herein. Examples that may include the apparatus and systems of various implementations can broadly include a variety of electronic and computing systems. One or more examples described herein may implement functions using two or more specific interconnected hardware modules or devices with related control and data signals that can be communicated between and through the modules, or as portions of an application-specific integrated circuit. Accordingly, the system disclosed may encompass software, firmware, and hardware implementations. The terms "module," "sub-module," "circuit," "sub-circuit," "circuitry," "sub-circuitry," "unit," or "sub-unit" may include memory (shared, dedicated, or group) that stores code or instructions that can be executed by one or more processors. The module refers herein may include one or more circuit with or without stored code or instructions. The module or circuit may include one or more components that are connected.

An example of the disclosure further provides a computer storage medium for storing computer software instructions used by the above-mentioned terminal, which includes a program designed for executing the above-mentioned method for acquiring random access configuration information.

An example of the disclosure further provides a computer storage medium for storing computer software instructions used by the above-mentioned base station, which includes a program designed for executing the above-mentioned method for acquiring random access configuration information.

A person skilled in the art would readily conceive of other examples of the disclosure after considering the specification and practicing the invention disclosed herein. The disclosure is intended to cover any variations, uses or adaptive changes of the disclosure. These variations, uses or adaptive changes follow the general principle of the disclosure and include common general knowledge or conventional technical means in the technical field that are not disclosed in the disclosure. The description and the examples are merely regarded as exemplary.

It should be understood that the disclosure is not limited to the precise structure described above and shown in the drawings, and various modifications and changes can be made without departing from its scope.

What is claimed is:

1. A method for acquiring random access configuration information, wherein the method is executed by a base station, and the method comprises:
   configuring a random access index for a terminal, the random access index being used to instruct the terminal to acquire Physical Random Access Channel (PRACH) configuration information of New Radio Based Unlicensed Access (NR-U);
   wherein the PRACH configuration information indicates Rach Occasions (ROs) for 2-step random access, and there are GAPs between the ROs indicated by the PRACH configuration information in time domain;
   wherein the method further comprises:
   receiving a first random access message sent by the terminal according to the PRACH configuration information, the first random access message being MsgA, a 2-step random access message of NR-U;
   wherein the first random access message is sent by the terminal according to the following steps:
   detecting a time-frequency offset of a Synchronization Signal Block (SSB) of the base station;
   performing synchronization time-frequency offset on the RO indicated by the PRACH configuration information according to the time-frequency offset of the SSB; and
   sending the first random access message to the base station according to the RO after the synchronization offset.

2. The method according to claim 1, wherein
   the PRACH configuration information is information configured according to any one of PRACH configuration format 1, PRACH configuration format 2, PRACH configuration format 3, or PRACH configuration format C;
   or,
   the PRACH configuration information is information configured according to PRACH configuration format A or PRACH configuration format B.

3. The method according to claim 1, wherein the receiving a first random access message sent by the terminal according to the PRACH configuration information comprises:
   receiving the first random access message sent by the terminal in a Listen Before Talk (LBT) manner in the RO indicated by the PRACH configuration information.

4. The method according to claim 1, wherein the receiving a first random access message sent by the terminal according to the PRACH configuration information comprises:
   receiving the first random access message sent by the terminal in an LBT manner within a single Channel Occupy Time (COT) in the RO indicated by the PRACH configuration information.

5. A method for acquiring random access configuration information, wherein the method is executed by a terminal, and the method comprises:
   receiving a random access index configured by a base station, the random access index being used to indicate PRACH configuration information of NR-U;
   acquiring the PRACH configuration information according to the random access index, the PRACH configuration information indicates Rach Occasions (ROs) for 2-step random access, and there are GAPs between the ROs indicated by the PRACH configuration information in time domain;
   wherein the method further comprises:
   sending a first random access message to the base station according to the PRACH configuration information, the first random access message being MsgA, a 2-step random access message of NR-U;
   wherein the sending the first random access message to the base station according to the PRACH configuration information comprises:
   detecting a time-frequency offset of a Synchronization Signal Block (SSB) of the base station;
   performing synchronization time-frequency offset on the RO indicated by the PRACH configuration information according to the time-frequency offset of the SSB; and
   sending the first random access message to the base station according to the RO after the synchronization offset.

6. The method according to claim 5, wherein
the PRACH configuration information is information configured according to any one of PRACH configuration format 1, PRACH configuration format 2, PRACH configuration format 3, or PRACH configuration format C;
or, the PRACH configuration information is information configured according to PRACH configuration format A or PRACH configuration format B.

7. The method according to claim 5, wherein the acquiring the PRACH configuration information according to the random access index comprises:
querying, according to the random access index, the PRACH configuration information from a PRACH configuration table.

8. The method according to claim 5, wherein the sending a first random access message to the base station according to the PRACH configuration information comprises:
sending the first random access message in an LBT manner in the RO indicated by the PRACH configuration information.

9. The method according to claim 5, wherein the sending a first random access message to the base station according to the PRACH configuration information comprises:
sending the first random access message in an LBT manner within a single COT in the RO indicated by the PRACH configuration information.

10. An apparatus for acquiring random access configuration information, wherein the apparatus is used in a base station, and the apparatus comprises:
a processor;
a memory for storing executable instructions of the processor;
wherein the processor is configured to implement the method for acquiring random access configuration information to claim 1.

11. An apparatus for acquiring random access configuration information, wherein the apparatus is used in a terminal, and the apparatus comprises:
a processor;
a memory for storing executable instructions of the processor;
wherein the processor is configured to:
receive a random access index configured by a base station, the random access index being used to indicate PRACH configuration information of NR-U; and
acquire the PRACH configuration information according to the random access index, the PRACH configuration information indicates ROs for two-step random access, and there are GAPs between the ROs indicated by the PRACH configuration information in time domain;
wherein the processor is configured to:
send a first random access message to the base station according to the PRACH configuration information, the first random access message being MsgA, a 2-step random access message of NR-U;
wherein the processor is configured to:
detect a time-frequency offset of a Synchronization Signal Block (SSB) of the base station;
perform synchronization time-frequency offset on the RO indicated by the PRACH configuration information according to the time-frequency offset of the SSB; and
send the first random access message to the base station according to the RO after the synchronization offset.

* * * * *